(12) United States Patent
Fisher-Jeffes et al.

(10) Patent No.: US 8,125,973 B2
(45) Date of Patent: Feb. 28, 2012

(54) TIME SHARED RAKE FINGERS AND PATH SEARCHER

(75) Inventors: Timothy Fisher-Jeffes, Cambridge, MA (US); Dilip Muthukrishnan, Cedar Park, TX (US); Thomas Keller, Great Shelford (GB)

(73) Assignee: Mediatek Inc., Science-Based Insustrial Park, Hsin-Chu (TW)

( * ) Notice: Subject to any disclaimer, the term of this patent is extended or adjusted under 35 U.S.C. 154(b) by 938 days.

(21) Appl. No.: 12/050,999

(22) Filed: Mar. 19, 2008

(65) Prior Publication Data

US 2008/0240067 A1    Oct. 2, 2008

Related U.S. Application Data

(60) Provisional application No. 60/921,200, filed on Mar. 30, 2007.

(51) Int. Cl.
*H04J 3/00* (2006.01)
*H04B 1/00* (2006.01)

(52) U.S. Cl. .......................... 370/345; 375/150; 375/152

(58) Field of Classification Search .................. 370/345; 375/150, 152
See application file for complete search history.

(56) References Cited

U.S. PATENT DOCUMENTS

| 6,327,534 | B1 * | 12/2001 | Levanon et al. | .............. 701/215 |
| 6,377,613 | B1 | 4/2002 | Kawabe | |
| 7,454,209 | B2 * | 11/2008 | Subrahmanya | ................ 455/441 |
| 2004/0058653 | A1 * | 3/2004 | Dent | ............................... 455/69 |
| 2005/0036537 | A1 * | 2/2005 | Zancho et al. | ................. 375/148 |
| 2006/0251155 | A1 | 11/2006 | Zhou | |

FOREIGN PATENT DOCUMENTS

| CN | 1411193 A | 4/2003 |
| CN | 1836381 A | 9/2006 |
| EP | 1 128 565 A2 | 8/2001 |
| EP | 1 300 961 A2 | 4/2003 |

* cited by examiner

*Primary Examiner* — Jeffrey Pwu
*Assistant Examiner* — Noel Beharry
(74) *Attorney, Agent, or Firm* — Winston Hsu; Scott Margo

(57) ABSTRACT

A rake receiver having a rake receiver finger operated in a time multiplexed manner to perform the task a plurality of fingers, each of these fingers being a virtual finger allocated to a time slot in an operation cycle of the rake receiver finger, and wherein a buffer is provided for buffering at least one received chip of data, and where a spare virtual finger is provided such that any virtual finger may request extra processing within an operation cycle of the time multiplexed rake receiver finger.

10 Claims, 12 Drawing Sheets

Architecture of the time-shared micro-searcher

TIME SHARED RAKE FINGERS AND PATH SEARCHER

RELATED APPLICATIONS

This application claims priority to U.S. Patent Application No. 60/921,200 filed on Mar. 30, 2007, the contents of which are incorporated herein by reference.

FIELD OF THE INVENTION

The present invention relates to a time shared finger and path searcher.

BACKGROUND TO INVENTION

Radio telecommunications systems using code division multiple access (CDMA) transmit multiple channels simultaneously in the same frequency band.

As shown in FIG. 1, a baseband signal 2 for transmission, which as used herein includes digital signals which may have been processed by a processor 4 to compress them, is modulated 6 using a modulation scheme such as Quaternary phase shift keying (QPSK) or quadrature amplitude modulation (QAM) so as to define a sequence of "symbols" that are to be transmitted.

The symbols which have both an in phase and imaginary component occur at a rate known as a symbol rate. The symbols from the modulator undergo two further processing operations prior to transmission.

The symbols are operated on by a spreading code 8 so as to spread the data from each symbol. The spread data is then further multiplied by a scramble code 10 which is specific to the cell that the mobile or base station is operating in. The result of these processes is to generate "chips" which are then transmitted following up-conversion 12 to the desired transmit frequency.

The spreading codes are selected such that they make the symbols mutually orthogonal. This condition applies whilst all of the chips are in time alignment (which is easy to achieve at the transmitter) but the occurrence of multiple transmission paths in the propagation channel between the transmitter and receiver can result in multiple versions of the same transmit sequence of chips arriving with different time delays and amplitudes at the receiver, as schematically shown in FIG. 2. To put the multi-path propagation problem in context, the chip rate for UMTS is 3.84 M chips per second. This means that a radio wave carrying the data propagates around 75 metres in one chip period. Consequently any path differences in excess of 75 metres allow two completely different chips to arrive at the receiver at the same time. The receiver needs to be able to undo the effects of the multi-path distortion to recover the transmitted data. The different propagation paths, as illustrated by the vertical lines 15 are sometimes referred to as "rays".

One technique for recovering the transmitted data is to use a rake receiver to seek to re-align the various time displaced versions of the original signal.

A rake receiver is schematically shown in FIG. 3. It comprises a plurality of individual processing channels 30-1, 30-2 to 30-N, known as fingers. Each finger allows the relative time alignment between the received signal and a de-spreading code to be adjusted. This enables signal power from each significant transmission path to be recovered and brought into time alignment.

In prior art rake receivers, each finger comprises a plurality of correlators so as to integrate the correlation product of the incoming signal with the de-spreading and descrambling code.

FIG. 4 schematically illustrates the functionality within known fingers of rake receiver. Each finger comprises several correlators. The correlators act to correlate the down converted and digitised signal $R_xI$ and $R_xQ$ provided by a radio frequency front end with descrambling signals provided by a local descrambling code generator which is known to the person skilled in the art and need not be described in detail here. The scrambling/descrambling codes are selected in a known manner and have the property that their autocorrelation function is large if the codes are in correct temporal alignment and substantially zero otherwise.

Each finger has a respective delay set up by a process for estimating the channel response and assigned to the finger such that it is responsible for recovering a signal from a specific one of the multiple transmission paths. Once set up, the finger uses a closed loop control to make sure that it is properly time aligned to within ⅛ chip with the signal it is seeking to receive.

Three correlators are used in the closed loop timing control and are provided with versions of the input signal, each slightly offset in time. An "early" correlator 40 receives an input directly from the RF front end. A delay of ½ chip is provided by a first delay element 42 and the output of the delay element is provided to an "on time" correlator 44 and data extraction correlators Data 0, data 1 to data N. The output of the delay element is further provided to a second ½ chip delay element 46 who's output is provided to a "late" correlator 46.

Thus, when compared to the "on time" correlator the "early" correlator sees a time advanced version of the input end the late correlator sees a time delayed version of the input.

The "early", "on time" and "late" correlators examine the data to identify a known sequence called the common pilot channel (CPICH) which is also used in the process of characterising the communications channel. By correlating with the CPICH and filtering it the receiver can use the relative powers of the early, on time and late correlators to check that it is properly aligned with the time delayed version of the signal that the particular finger has been assigned to, and to adjust it's timing if necessary by modifying the timing of the de-spreading sequence with respect to an internal reference time, or modifying the timing of the received signal with respect to the despread (sometimes referred to as derotated) sequence. The process of adjusting the time to maintain alignment with the "on time" symbols is commonly referred to as a "delay locked loop". Only the magnitude (or power) of the signals at the outputs of the correlators is of use in time aligning the finger using the delay locked loop. The "on time" correlated output can then also be used as the phase reference to de-rotate the data at the correlator outputs (as part of a maximum ratio combining process where both phase and magnitude are considered), or looked at in a different way, to remove phase uncertainty from the data. If the "on time" phase reference is not used, then another time multiplexed pilot phase reference can be used instead in order to achieve the same objective.

The data could be decoded by a single channel but in a terminal conforming to or having capabilities up to the high speed data packet access (HSPDA) category 6 standard the data could be in any one of twelve data channels. To ensure data recovery the finger includes a correlator for each of these twelve channels.

For transmit diversity a time multiplexed pilot is used and as these are only ever carried on one physical data channel the correlator for this channel can be succeeded by two further correlators arranged to detect the A and B pilots, respectively.

This architecture repeated across several fingers of the rake receiver can take up significant space on a silicon die.

As briefly alluded to herein before, the channel response must be estimated prior to setting up the appropriate delay for each finger of the rake receiver. The channel response is estimated by a path searcher which, in essence, looks across all possible delay times within a search window to correlate a received signal having the CPICH therein with various time delayed versions of the despread and descramble codes. Therefore there is similarity between the functionality provided as part of the rake receiver to check that it remains time aligned using the power bearing components of the "early", "on time" and "late" CPICH which has undergone multi-path distortion and the path searcher which is used to characterise the transmission path and hence to identify those power bearing components with the different time delays which should be realigned at the receiver in order to improve the signal to noise ratio.

The prior art rake receiver architecture typically includes 9 fingers and a shared combiner. Each finger is instantiated separately despite sharing the same structure. The prior art receiver also has a separate path searcher, and possibly a plurality of them.

The prior art finger (i.e. not complying with HSPDA category 6) consists of anywhere between five and seven correlators (to integrate and dump). Five of the correlators have a filter engine attached to provide a moving average of the symbols it correlates against. The pilot (CPICH and TMP) symbols are used for phase rotation. Filtering provides a less noisy version of these pilot signals. The filtering is varied to account for the physical speed of the mobile device, and can be done over two pilot symbols for a fast moving device and 16 pilot symbols for a slow moving device.

SUMMARY OF INVENTION

According to a first aspect of the present invention there is provided a rake receiver having a rake receiver finger operated in a time multiplexed manner to perform the task of a plurality of fingers, each of these fingers being a virtual finger allocated to a time slot in an operation cycle of the rake receiver finger, and wherein a buffer is provided for buffering at least one received chip of data, and where a spare virtual finger is provided such that any virtual finger may request extra processing within an operation cycle of the time multiplexed rake receiver finger.

It is thus possible to allow a finger to be operated in a time multiplexed manner so that it can perform the processing that would otherwise have been done by several fingers of the rake receiver. This provides an immediate and significant reduction in the space taken up by a rake receiver on an integrated circuit die. In itself time multiplexing is well known for many circuits—although not necessarily for rake receivers. A significant feature of the present invention is the provision of a spare slot within the multiplexer operation and the ability of a virtual finger to request extra processing from the real time multiplexed finger so that the virtual finger can perform timing adjustments without data corruption occurring.

Thus a real finger can synthesis the functionality of several virtual fingers.

Advantageously the buffer, or an additional buffer, can also receive and buffer data e.g. $R_xI$ and $R_xQ$ from a further receive path such that the rake receiver can implement receive mode diversity.

According to a second aspect of the present invention there is provided a method of operating a correlator block comprising at least one correlator adapted to recover a pilot signal and at least one correlator for recovering a spread symbol from a plurality of chips in a time multiplexed manner so as to form a plurality of virtual fingers of a rake receiver, the method comprising buffering at least one chip of data in an input buffer and enabling each virtual finger to access data from the buffer, and wherein a virtual finger can request an additional processing slot in a multiplex cycle if the virtual finger requests data that has been held within the buffer for less than a predetermined period.

According to a third aspect of the present invention there is provided a path searcher having a path search finger having a plurality of correlators therein such that each correlator can test a different delay from the other correlators for path searching, and wherein the path search finger is operable in a time multiplexed manner such that the path search finger can perform the functionality of a plurality of path search fingers.

Preferably the path search finger is clocked at a rate in excess of the chip rate—or in excess of a product of the chip rate and an over sampling factor where the chips are over sampled—such that the path search finger works N times faster than a non-time shared path search finger, where N is an integer representing the number of virtual path search fingers that can be simulated by operating the time multiplexed finger in a shared/multiplexed mode.

According to a fourth aspect of the present invention there is provided a combined path searcher and rake receiver, wherein a finger is operated in a time multiplexed manner to process received signals for path searching or for data extraction from a code division multiplexed signal.

Advantageously multiplexers are associated with each of a plurality of correlators within the finger such that a correlator output can be used to output extracted data when operating as a rake receiver or can be filtered and sent to a power bin when acting as a path searcher.

BRIEF DESCRIPTION OF THE FIGURES

Embodiments of the present invention will now be described, by way of non-limiting example only, with reference to the accompanying drawings, in which.

DESCRIPTION OF PREFERRED EMBODIMENTS OF THE PRESENT INVENTION

Time Shared Rake Finger

Figure 5:
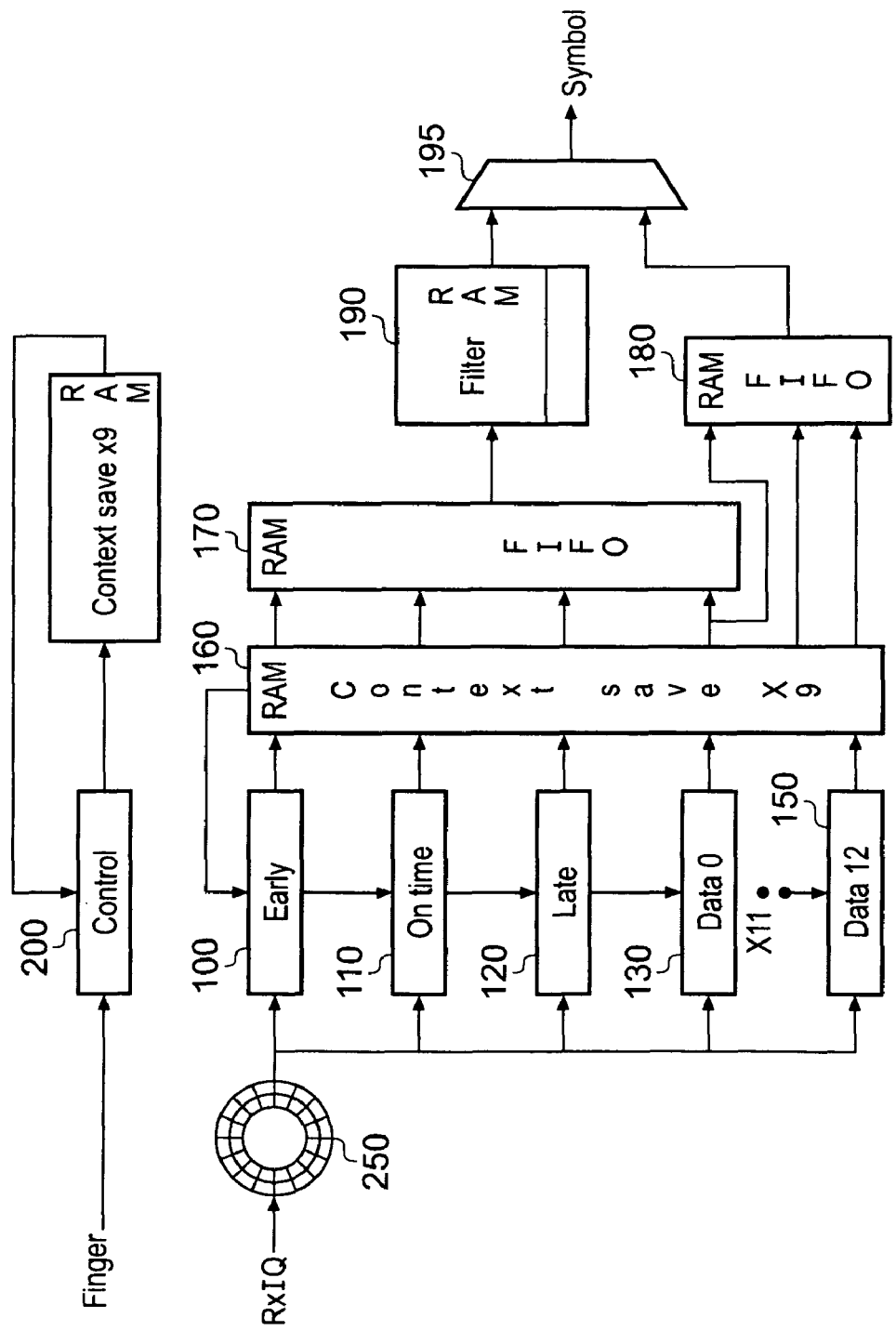
FIG. 5 schematically illustrates a time shared rake finger which is operable to act as a plurality of virtual fingers.

FIG. 5 schematically illustrates a time multiplexed rake receiver finger constituting an embodiment of the present invention. Conceptually the rake receiver finger is similar to the prior art design. Thus the rake receiver finger comprises a plurality of correlators each arranged to receive an input signal from an RF front end which has received the incoming radio transmission, down converted it to base band in a quadrature detection system, and digitised the base band signals into an in phase channel and a quadrature channel. The base band signal is conventionally referred to as $R_xQ$ to designate that it contains real and imaginary components. Three of the correlators 100, 110 and 120 are used to identify the common pilot, CPICH, signal transmitted each frame so as to try and keep the receiver finger time aligned with the time delayed version of the multi-path signal which it is desired to recover. Assuming that the "on time" correlator 110 is supposed to recover the pilot signal when the finger is correctly time aligned with the time delayed version of the signal that it is seeking to recover, then the early correlator 100 seeks to correlate with a version of that signal occurring half a chip before the nominally correct correlation time and the late correlator 120 seeks to correlate with a version of the signal half a chip later than the nominal correct time. Thus the early, on time and late correlators 100, 110 and 120 provide a mechanism by which the finger can detect timing drift between it and the signal such that a feedback mechanism can apply a timing correction to keep the finger of the rake receiver correctly time aligned with the version (multi-path delayed signal) of the transmitted signal that it is seeking to recover. Data correlators 130 to 150 are provided to correlate the incoming data with any one of the twelve data channels that could be supported by a terminal supporting high speed data packet access up to category 6. The channels are broken down such that three data channels are used for primary common control physical channel, secondary common control physical channel, and a dedicated channel, P-CCPCH/S-CCPCH/DPCH, four channels are used for high speed physical downlink shared channel, HS-SCCH, and five data channels are used for high speed physical downlink shared channel, HS-PDSCH. Each of the twelve data channels is spread by a further channel code and hence data correlators correlate against each of the possible codes simultaneously in order to ensure that each data channel is recovered. Each correlator performs an "integrate and dump" operation. The operation of the correlators can in itself be entirely conventional and need not be described in detail as they are understood by the person skilled in the art. In order to perform the running summation used in the integration each correlator writes temporary values to a context save memory 160. At the end of each despreading operation the recovered symbol from the context save memory 160 is transferred to further buffers, implemented as memory 170 and memory 180. The memories 170 and 180 can be implemented as first in first out (FIFO) buffers.

Figure 4:
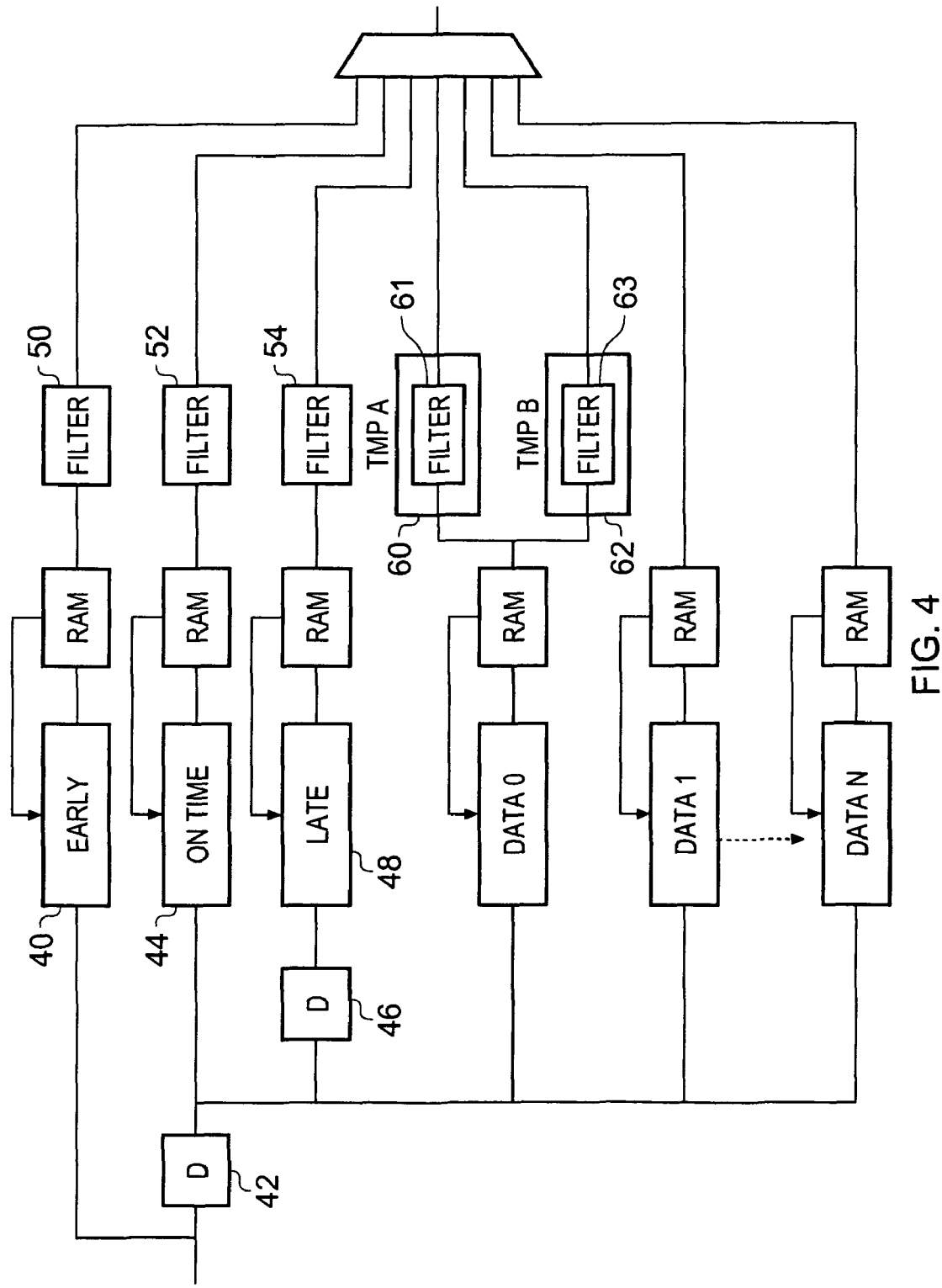
FIG. 4 schematically illustrates a prior art finger architecture.

Returning to FIG. 4, it is noted that filters 50, 52 and 54 had been provided for filtering the common pilot signal and that optionally filters 61 and 63 were also provided within the time multiplexed pilot recovery block 60 and 62, respectively. It is also noted that these filters only received an update after each run of chips corresponding to the spreading/despreading code length and hence the filters were updated only infrequently. As a consequence, a single filter 190 can be provided in a time multiplexed manner to perform the task of the filters 50, 52, 54 and those 61 and 63 within the blocks 60 and 62. The correlators 100, 110, 120, 130 to 150 and memories 160, 170, 180, are all controlled by a finger controller 200 which controls the relative timings of the descrambling/derotation codes with respect to an arbitrary time reference. The filter 190 and multiplexer 195 can also be controlled by the finger controller 200 or their own controllers.

Figure 1:
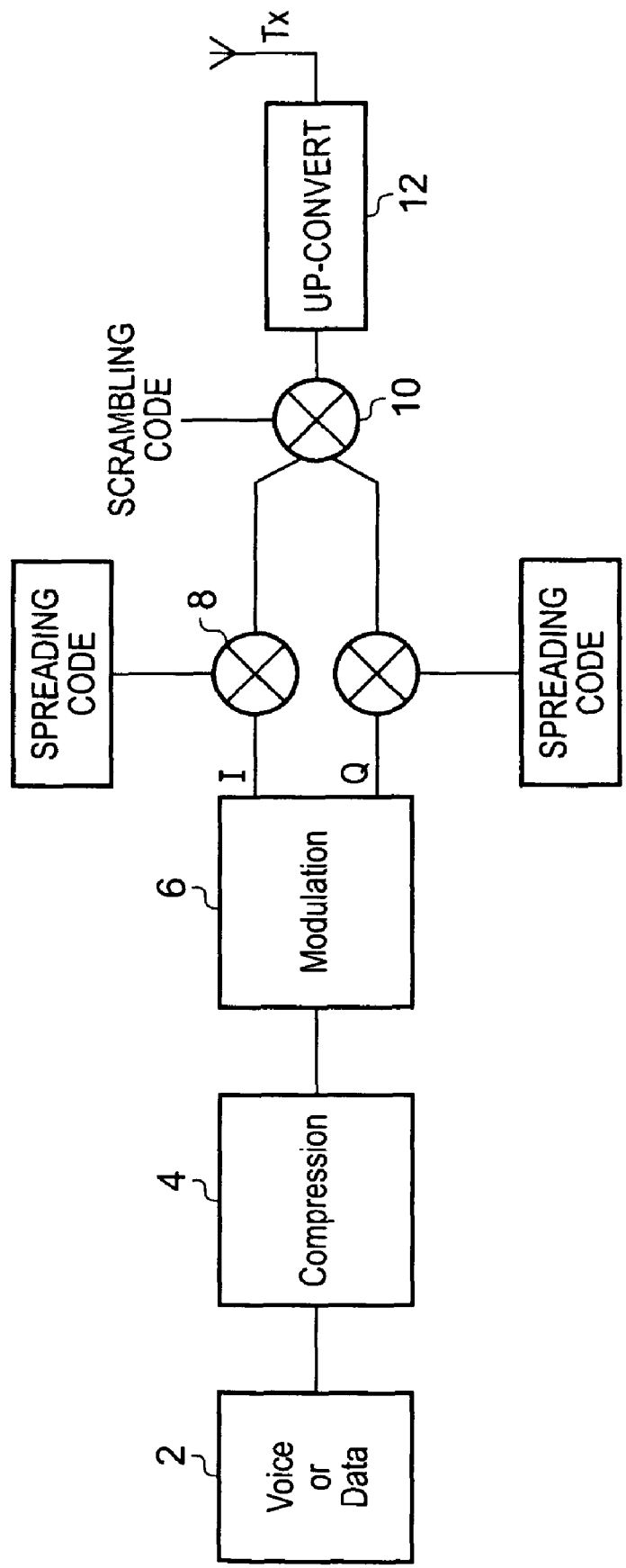
FIG. 1 schematically illustrates the steps used to encode data in a code division multiplexed access system.
Figure 2:
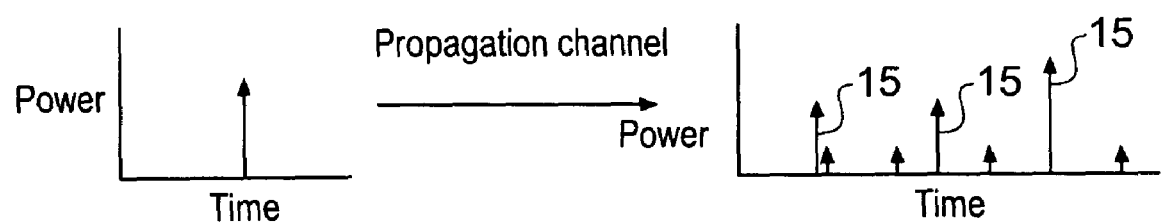
FIG. 2 schematically illustrates the consequence of multi-path distortion on the propagation of a signal.
Figure 3:
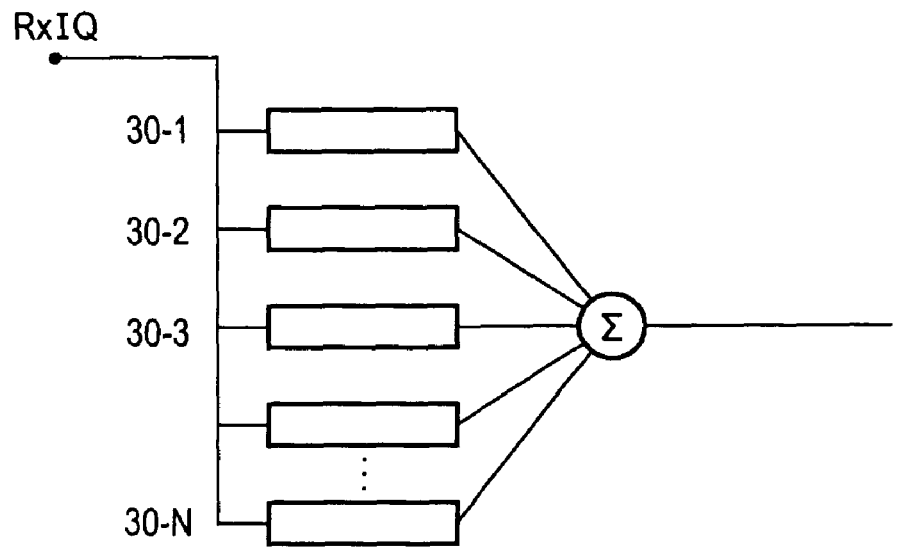
FIG. 3 schematically illustrates a rake receiver architecture.

In order to consider how the finger shown in FIG. 5 can be used in a time multiplexed manner, it is instructed to briefly consider the operation of the prior art rake receiver shown in FIG. 3 when receiving a signal of the type shown in FIG. 2.

As shown in FIG. 2, the receive signal may undergo multi-path reflection so that various versions of it arrive at the receiver, of which versions 20, 21 and 22 are shown as having the greatest amplitude. We may, for convenience, measure time in terms of chip intervals. If we suppose that signal 21 is delayed with respect to signal 20 by, say, 30 chip intervals and that signal 22 is delayed with respect to signal 20 by 70 chip intervals then the signals can be brought into alignment within the receiver by allocating a first finger to recover signal 20, a second finger to recover signal 21 and a third finger to recover signal 22. The despreading code for the finger 21 is itself delayed by 30 chips with respect to the finger 20 and the despreading code for finger 22 is delayed by 70 chips with respect to the despreading code for finger 20. Consequently each finger will output its result at a slightly different point in time, but the results from each finger are combined by a maximum ratio combiner which can take account of this slight temporal offset.

The inventors have taken account of this inherent delay within the output of each finger within a rake receiver to allow the circuit shown in FIG. 5 to be time multiplexed. However a problem with time multiplexing is the need to account for drift of the timing of one finger with respect to any of the other fingers resulting from changes in the properties of the communications channel, and hence changes in the relative receive times of the multi-path versions of the transmitted signal.

The inventors have overcome this problem by the inclusion of a buffer 250 which precedes the correlators. The buffer 250 contains over sampled chip samples. The buffer also needs to contain sufficient data samples to allow at least one chips worth of data to be held in the buffer at any time, plus an additional timing margin either side of the chip. In a preferred embodiment of the invention the $R_xIQ$ data is presented to the finger at eight times the chip rate, a finger correlator needs to sample the received $R_xIQ$ data stream nominally once every chip. Thus any one of eight samples could belong to a particular chip. In a preferred implementation of the buffer, the buffer holds two chips worth of data within any one of sixteen memory locations. For convenience, the buffer 250 has been implemented as a circular buffer with a write pointer being sequenced through the locations 0-F (in hexadecimal) of the buffer and one or more read pointers being offset from the write pointer by a variable amount.

Returning to FIG. 2, suppose we consider the operation of a finger arranged to receive signal 21 which, as we know, is delayed by 20 chips from signal 20, but allowing for the fact that signal 20 may itself drift in time, signal 21 may be set to an arbitrary number of chips, in this example lets say 50, from a reference time T0.

In the prior art rake receiver the despreading code for the on time correlator 44 will be set to 50 chips plus delay value, D, which is typically half a chip so that the despreading code would be 50.5 chips with respect to the nominal time T0. The same code would be applied to the early correlator 40, the late correlator 48 and all of the data correlators. The half chip delay elements 42 and 46 would mean that if the rake receiver was properly "on time" then the output from the filter 52 would be greater in amplitude than that from filters 50 or 54 following recovery of the CPICH. However if the rake receiver started to drift from the true position of the receive signal then the amplitude of the filter 52 would reduce and the amplitude at the output of either 50 or 54 would increase. This information could then be used to adjust the relative timing of the spreading sequence time with respect to the received $R_X IQ$ or the nominal reference time. This would allow the receiver to be kept on track. The same process could be applied independently for each of the other fingers in the rake receiver. It should be noted that a second function of the "on time" CPICH correlations is to provide a phase reference for the combiner to de-rotate the data correctly, i.e. to remove phase uncertainty in the data.

The same approach does not work quite so well in a time multiplexed finger because the hardware is significantly more busy, and because timing adjustments need to be made without losing data.

Figure 6:
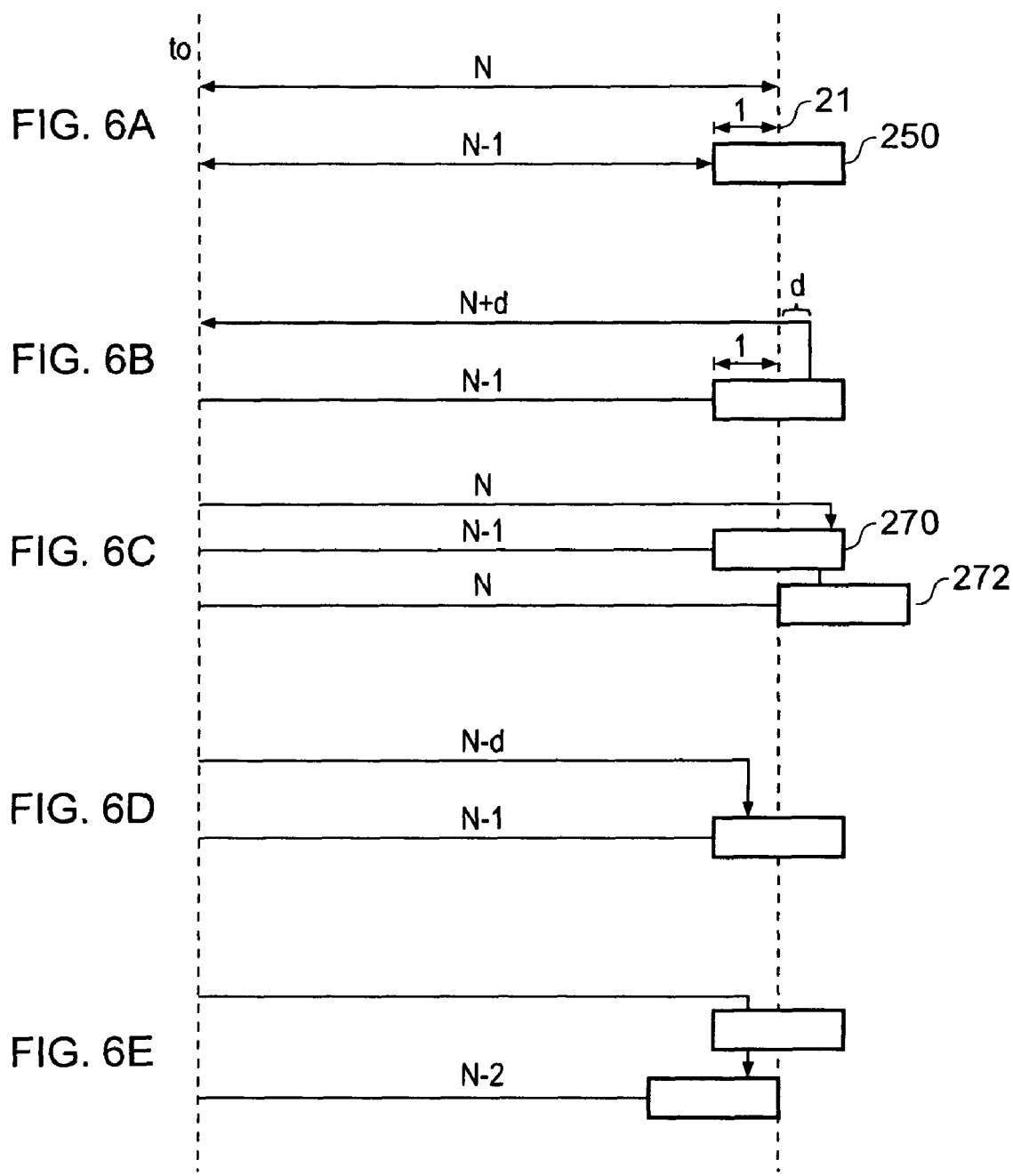
FIGS. 6a to 6e are timing diagrams illustrating how the circular buffer and spare multiplex slot can be used to provide timing adjustment without data loss.

The inventors have overcome the problems of individually adjusting the relative timings of the "virtual fingers" implemented by using a single physical finger in a time multiplexed manner, as will be described with respect to FIG. 6. As used herein a "virtual finger" can be thought as being the real finger of a non-time multiplexed system which has been synthesised within the time multiplexed system.

With respect to FIG. 6, again consider the situation where we are trying to recover signal 21 which has delayed an arbitrary number of chips N from a nominal reference time T0. In the worked example we want N to be equal to seventy chips.

The buffer 250 stores two chips work of data and we can therefore consider that in normal operation we would like the read pointer to be positioned half way through the buffer such that, as shown in FIG. 6a, one chips worth of delay is provided by the buffer and hence a further N−1=69 chips worth of delay could be provided by timing the despreading code supplied to the correlator from a code generator correctly with respect to the notional reference time.

As noted before, each chip is eight times over sampled. Therefore if, as shown in FIG. 6b, the signal 21 becomes the delayed with respect to time zero by a value "d" then the nominal "on time" position of the finger becomes early with respect to the true position of the signal. This can be corrected by retarding the read pointer by an amount equivalent to the time period d (subject to the fact that it is quantised to ⅛ chip intervals) in order to seek to restore temporal alignment.

However, as the buffer is only of limited length, then as the drift in time d increases then the read pointer moves nearer and nearer to the end of the buffer. If nothing is done to correct this then the read pointer will reach the limit of the buffer and then temporal alignment will be lost.

The present invention checks the relative position of the read pointer with respect to the write pointer and if the read pointer becomes advanced with respect to the write pointer by more than a threshold value, indicating that the finger is becoming advanced with respect to the received signal by more than a threshold value, then the finger is instructed to miss one correlation event within the multiplexed finger architecture and the read pointer is then moved away from the write pointer by a value corresponding to one chip, as shown schematically in FIG. 6c. Here buffer 270 schematically illustrates the position of the read pointer within the buffer prior to missing one correlation event, and buffer 272 represents the new position of the read pointer within the buffer following that particular virtual finger missing its turn for processing data using the real finger.

Suppose now that the signal 21 retards with respect to the nominal time T0. The nominal "on time" position of the virtual finger therefore becomes delayed with respect to the new arrival time of the data. This can be accommodated by retarding the read pointer away from the write pointer thereby increasing the delay provided by the buffer. This is schematically illustrated in FIG. 6d. However, if signal 21 drifts sufficiently back in time, then the read pointer starts to approach the position of the write pointer. This cannot be allowed to continue as ultimately the virtual finger will need to read data after it has been overwritten at the input buffer. The inventors have overcome this problem by configuring the multiplexed finger such that there is at least one spare virtual finger available such that any finger which finds itself approaching the end of the buffer can place a request to process two chips worth of data within a single multiplex sequence by offloading part of the processing to the spare time slot. In so doing, the controller 200 needs to take account of the fact that two chips worth of processing have occurred within a single chip period and thereby reduce the despreading signal delay with respect to the nominal time T0 by one chip, as illustrated in FIG. 6e.

The buffer can be implemented as a block of sixteen memory elements located in RAM, or as sixteen shift registers connected in series. In such an arrangement data is always shifted into the first register and then the offset for the read pointer from the register is adjusted in order to keep the virtual finger nominally on time as determined by the filtered outputs of the early, on time and late correlators. Each of these correlators can pick up its data by a further offset from the position of the "on time" read pointer.

Figure 7:
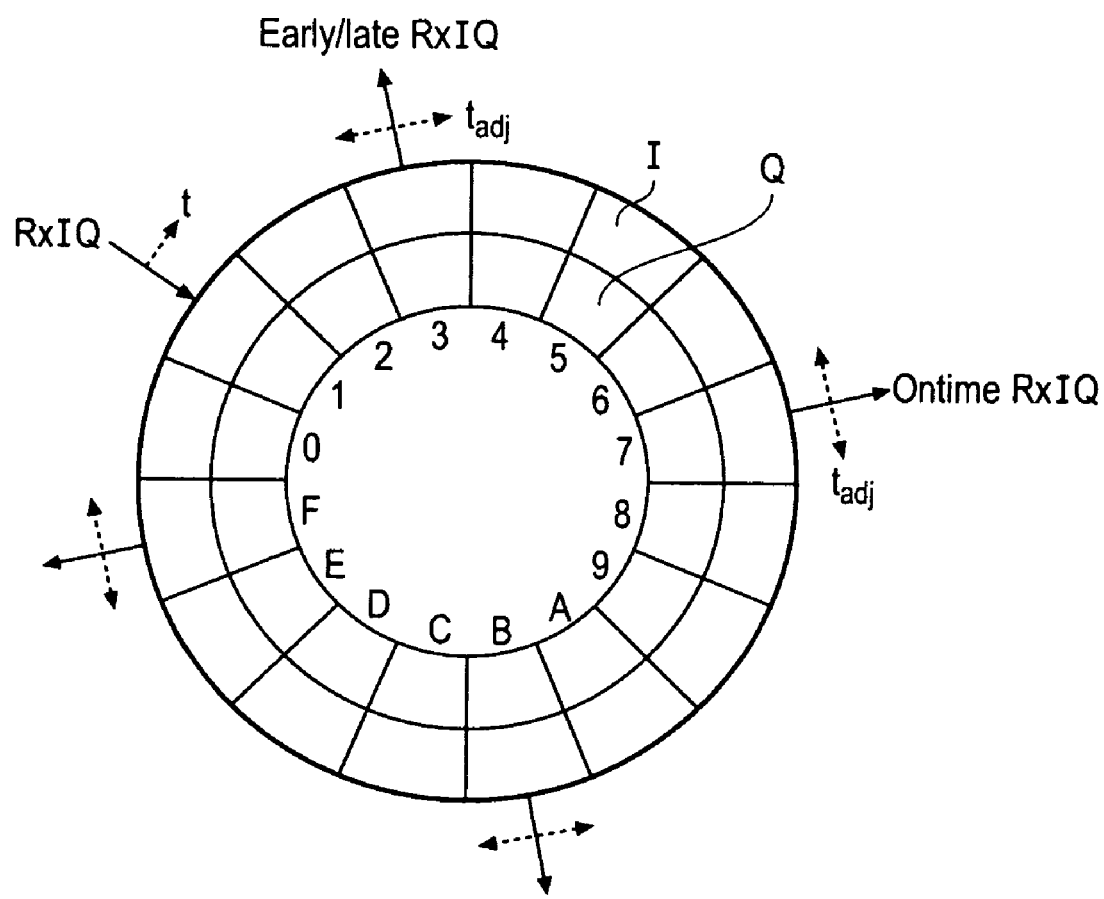
FIG. 7 shows the buffer of the time shared finger of FIG. 5 in greater detail.

If the buffer is implemented in RAM, then both read pointers and write pointers need to circulate around the RAM, and as such it is convenient to think of it as a circular buffer as schematically shown in FIG. 7. It can be seen that as the buffer holds two chips worth of data.

If no timing adjustments are being made to the read pointers shown in FIG. 7 then the pointers bounce back and forth across the two halves of the circular buffer with respect to the position of the write pointer.

The circular buffer holds two chips of data. In essence one can consider the circular buffer as having two halves, one for each chip. So when an incoming sample is being written to the buffer, say for chip 1, the fingers are using samples from the other half—the half that was filled in chip 0. On the next chip—chip 2, the incoming samples overwrite the values form chip 0, while the fingers are now reading from the half that holds chip 1. Hence the read pointer has bounced to the other half of the buffer. This sequence continues through the entire operation.

The buffer is shown as being two elements wide, corresponding to data from the I channel and the Q channel of the RF front end, respectively.

A typical rake receiver generally comprises between eight and twelve fingers. A buffer containing sixteen individual samples enables a single physical finger to provide the action of sixteen discreet fingers. Thus, with typically only ten or so fingers being required to be implemented, there are several spare slots available within the multiplex so that a plurality of fingers could request additional processing within the same multiplex cycle.

It is thus possible to enable a single physical finger to be operated in a time multiplexed manner.

Figure 8:
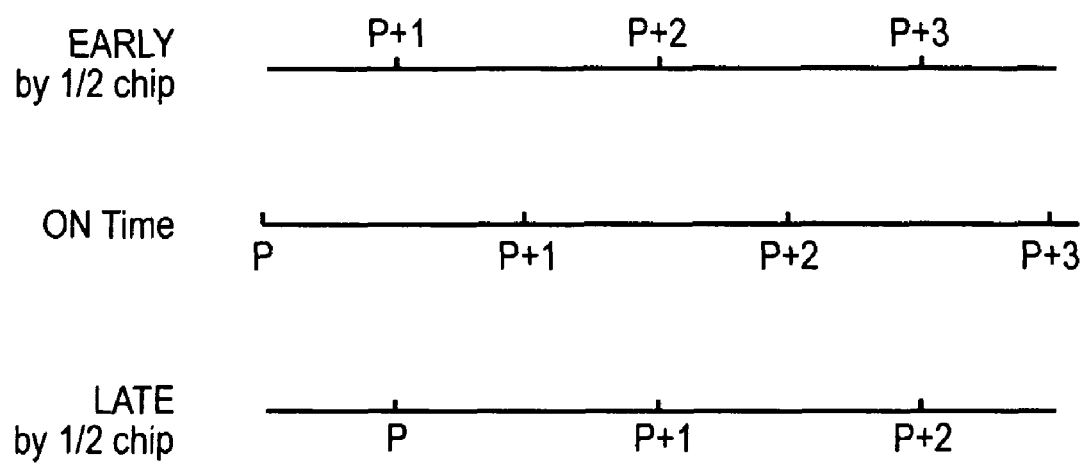
FIG. 8 is a timing diagram showing a relation between early and late samples.

A further advantage of using a time multiplexed rake receiver finger to implement the functionality of several virtual rake receiver fingers is that the processing power for the early and late correlators can be reduced. Consider a chip sequence as shown in FIG. 8 where we start counting at chip P and have a sequence P+1, P+2, and P+3. It can be seen that the "early" correlation for chip P+1 is in time alignment with the late correlation for chip P. Similarly the correlation that is early for P+2 is identical to the late correlation for P+1. This is because of the ½ chip spacings that have been chosen. Therefore one read pointer can provide data for both the early and late correlators which are used by the control loop to maintain the virtual finger in the correct timing relationship with regards to the signal that it is seeking to recover. It is thus possible to provide a time multiplexed finger which allows any one of the virtual fingers implemented therein to retime themselves without giving rise to data loss or data corruption.

The combiner may be required to work with systems that lack a CPICH as a phase reference. Systems like these have a time multiplexed pilot, TMP, symbols instead. TMP symbols are only ever carried on one data physical channel so nominally this is chosen to always be the first data channel correlator. During TMP symbol correlation the first data channel correlator is modified in such a way as to further correlate against the TMP pattern encoded on antenna A. For embedded TMP symbols an additional correlator, modified in the same way, is provided to correlate against the TMP pattern encoded on antenna B. A co-pending patent application has been filed in respect of an apparatus for modifying the correlation code for TMP correlation. CPICH correlations are done at the same time offset (labelled on time) as the data symbols.

Hence a rake finger consists of a total of 16 correlators split between data, pilot and TMP. At the end of every correlation, a set of data is provided to the combiner interface, if they are data symbols, and/or to the filter, if they are pilot symbols.

All pilot symbols, time-multiplexed or CPICH, are further rotated by a fixed $-\frac{1}{4}\pi$ and then filtered. The filtering is a very simple moving average filter over a length specified in powers of two. For CPICH symbols the length specifies a multiple of 512-chips while for TMP symbols the length specifies a multiple of slots. For CPICH symbols, prior to filtering, space-time transmit diversity decoding is applied to separate out antenna A and antenna B symbols. TMP symbols are already split at this point. Antenna A and antenna B symbols are then filtered independently. The filtered outputs are provided to the combiner interface to be placed on the finger bus along with the data symbols in a serialised stream. The filtering helps to remove noise from the symbols.

The rake finger is clocked by a 16× chip-rate clock. Nominally correlators run at chip-rate, but with a resolution of ⅛ chip-rate. This implies an activity ratio of 1/16 of their clocked rate. A total of nine fingers are believed to be required to achieve the level of receive performance. This implies that the processing required by these nine fingers can be time-sliced within a single rake finger engine as described hereinbefore with respect to FIG. 5.

Thus the single finger of FIG. 5 can perform the functionality of the plurality of rake fingers illustrated in FIG. 3. The rake finger is shown as being preceded by a circular buffer which is an optional feature within the circuit but which is advantageous for allowing timing adjustments within the time multiplexed finger to be made without incurring the penalty of loss of data. A rake finger is responsible for correlating N, where N is a power of two, of these incoming radio data (RxIQ) symbols against a combination of a scrambling code and spreading code of length N. The application of the combined scrambling and spreading code results in a simple de-rotation operation of one of 0, $\pi/2$, $\pi$ or $-\pi/2$. A rake finger is responsible for correlating against both data and pilot symbols concurrently. Pilot symbols could be from time-multiplexed pilot (TMP) symbols embedded in the same channel (DPCH or S-CCPCH) carrying the data symbols or from a common pilot indication channel (CPICH). The buffer reads, integrate and dump strobes, frame and slot strobes are all managed by the control logic.

Receive Diversity

Release 5 specification for HSPDA includes advanced receiver architectures to increase downlink (base station to mobile device) capacity. One of the proposed architectures is "receive" diversity which requires a second receive chain, i.e. 2nd RF front end, analog base band section, filters, rake receiver and so on.

The inventors have released that the time multiplexed finger can be adapted to receive data from the second receive chain and to perform correlation for it. Thus the buffer could be made wider to receive data from the second receive chain or a second buffer for receiving $R_x$IQ data from the second receive chain could be provided and the finger can then select to process data from either buffer.

Path Searching

Path searching (which is performed to identify the ray paths carrying the most signal energy and to identify their times to ½ chip accuracy) requires the identical operations to that which a rake finger does to the CPICH. Path searching is only done on the CPICH. The difference is that path searching extends the concept of early, on time and late to more such ½ chip time offsets at a time. It is convenient to extend this concept to process a number of delays equal to a power of 2. Consequently the path searcher conveniently has 16 channels or parallel correlators.

Filtering of CPICH symbols within a path searcher/microsearcher is not done as a moving average, but simply a one shot accumulation over a power of two in length. The filtered outputs are not sent to the combiner interface but instead to a power binning module where the top several CPICH correlation powers are identified and stored along with their respective time offsets. The top rays are further sorted according to their power.

The inventors realised that the circuit configuration of the time multiplexed finger described hereinbefore could be modified to form a path searcher. The early, on time and late correlators 100, 120 and 130 already have the correct functionality as their outputs are sent to filter 190. This functionality needs to be extended to further correlators such that each one of them can send their output to a filter.

Figure 9:
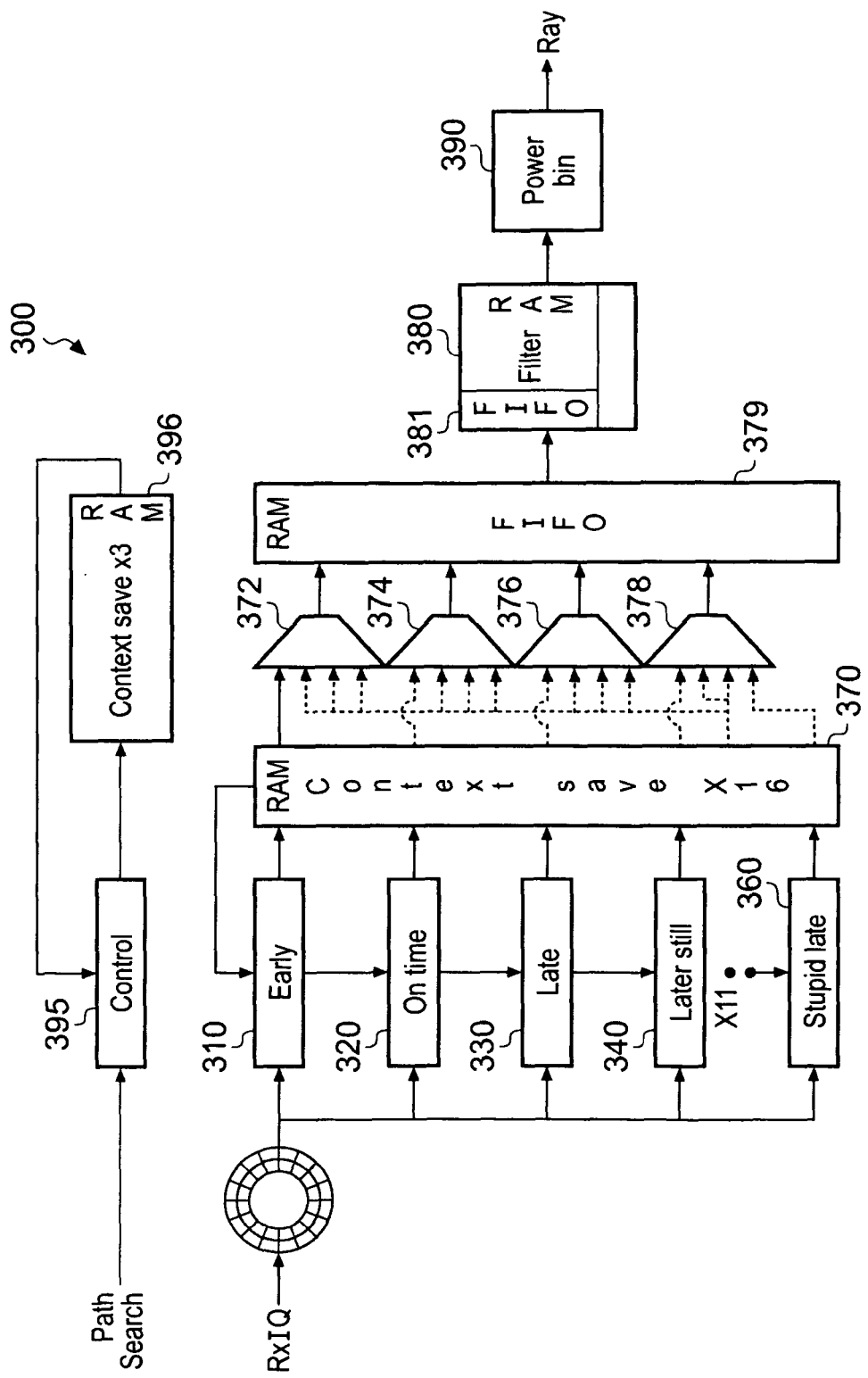
FIG. 9 schematically illustrates a time shared path-searcher constituting an embodiment of the present invention.

FIG. 9 shows a "finger" for a path searcher. The finger has a plurality of correlators 310, 320, 330, 340, 360 which for convenience is a power of 2. In this example there are sixteen correlators. Each correlator forms a running sum so the context save RAM 370 is to be regarded as individual memory segments that belong uniquely to each one of the correlators. However, it will be appreciated that it is an inefficient use of space to fabricate small islands of memory within an integrated circuit and consequently it is more efficient to fabricate a larger memory but to allocate parts of it to the individual correlators. The outputs of the correlators are then made available to a filter 380 via multiplexers 372, 374, 376, 378 and FIFO 379. An output of the filter is then provided to a power bin 390 which keeps a record of the correlation power versus timing offset for each possible ray path.

The "finger" is time multiplexed so the memory associated with each correlator stores separate running totals, one per multiplex, for each of the correlators. Additionally the memory use can be improved by arranging the memory such that it is shared efficiently between usage for rake fingers and that for path searchers. In a preferred implementation an additional path searcher finger uses the same amount of memory as an additional rake finger. A control register 395 and memory 396 is provided to keep track of the offsets and the operation of the multiplexer. The circular buffer provided as part of the time shared rake finger is not required during path searching as the path searcher is not required to form a delay locked loop to track drifts in the position of the CPICH. Thus the circular buffer read positions are fixed for the duration of the path search and the mechanism for adjusting the pointers within the buffer is either disabled or bypassed. This position is dependent on the relative start time of the path search and its allocated time slot within the time multiplexed schedule.

The differences in the data path between a time-shared finger architecture of FIG. 5 and a time-shared path-searcher architecture of FIG. 9 are the insertion of a multiplexing stage 378 between the data context memory 370 and the FIFO 379 and an insertion of a FIFO 381 within the filter engine. The additional FIFO 381 within the filter engine is to account for the much higher burst rate of path-searcher correlator data arriving at the filter engine. The last difference between the two is the addition of a power binning module on the back 390 of the filter and no combiner interface (FIFO 180 and multiplexer 195 of FIG. 5) and associated data symbol path.

Combined Rake Receiver and Path Searcher

The inventors have further realised that it is possible to share parts of the rake receiver and path searcher architectures in a single functional block.

Figure 10:
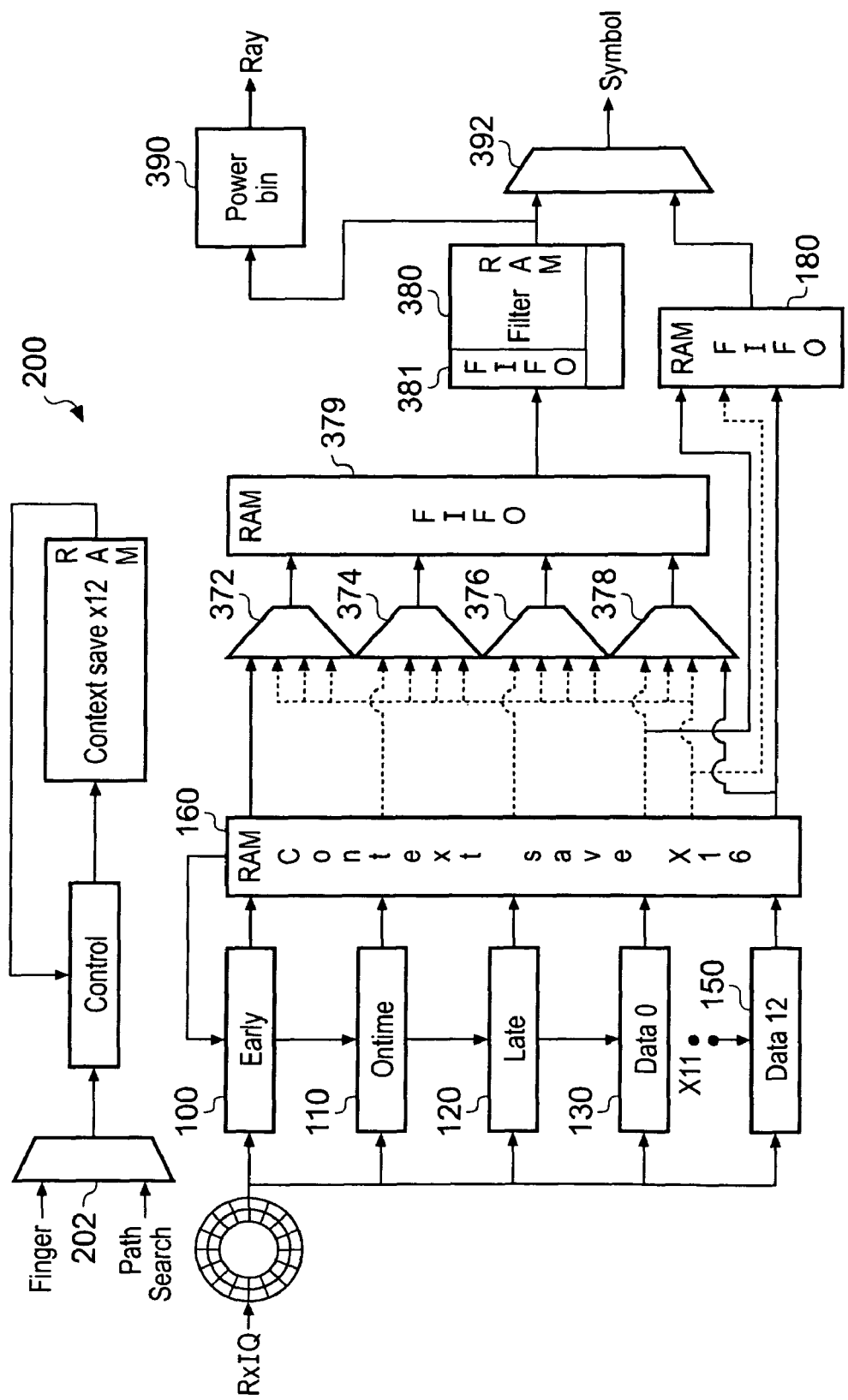
FIG. 10 schematically illustrates a time shared rake receiver finger and path-searcher constituting an embodiment of the present invention.

A combined time multiplexed finger and time shared micro searcher is schematically illustrated in FIG. 10. Comparing the combined time multiplexed rake finger and path searcher of FIG. 10 with the time multiplexed rake finger of FIG. 5, and using the same numbering as previously used in FIG. 5, we see that the data correlators 100 to 150 remain unchanged. This is because the same number of correlators appear in a rake finger capable of receiving up to HSDPA category 6 as does in a path searcher requiring a delay spread of sixteen ½ chip spacings. The context save memory 160 is increased in size to account for the fact that the time multiplexed finger in the rake receiver only had to process nine channels, whereas any additional path searchers would add additional finger contexts. As a consequence of integrating rake receive and path searcher functionality the control register 200 has its number of channels increased, in this example to 12 channels because it saves data for 9 fingers and 3 path searchers, and a multiplexer 202 is provided in front of the control register 200. The output from the context saved memory 160 is now provided via multiplexers 372, 374, 376 and 378 to FIFO memory 379 from where it can be output to a filter 380 including an additional FIFO memory 381 and from there to a power binner 390. However the output of the filter 390 can also be provided to a multiplexer 392 for outputting a symbol to a combiner. The outputs of the data correlators can also be multiplexed to a FIFO memory 180 and from there to the multiplexer 392 for output of the combiner. Consequently a time multiplexed finger can now also perform the task of a path searcher. This further reduces the silicon footprint required for the rake receiver and the channel estimator.

Figure 11:
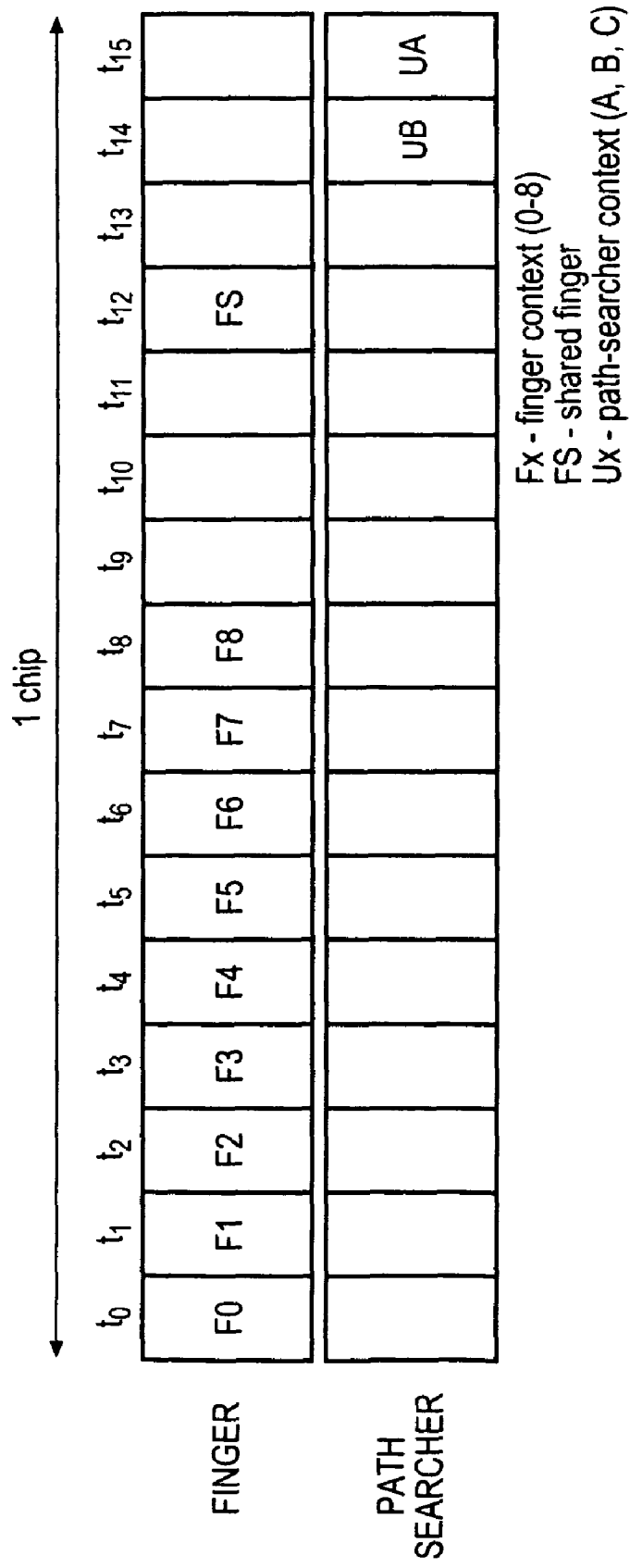
FIG. 11 shows a default allocation of virtual fingers to time slots in a multiplex cycle.

Each of the sixteen time slices available for use within the time multiplexed finger is allocated to either a virtual finger, or a path-search-A, -B or C context. A proposed default allocation of time slots is shown in FIG. 11. It can be seen that in the rake receiver mode, nine virtual fingers designated F0 to F8 are allocated to time slots T0 to T8, and an additional shared time slot which can be accessed by any one of the fingers for additional processing is allocated to slot T12.

For the path searchers slots T14 and T15 are allocated to path searching context B and path searching context A, respectively. In an embodiment of the invention T13 is assigned to path searching context C, although each of these allocations could be changed.

Figure 12:
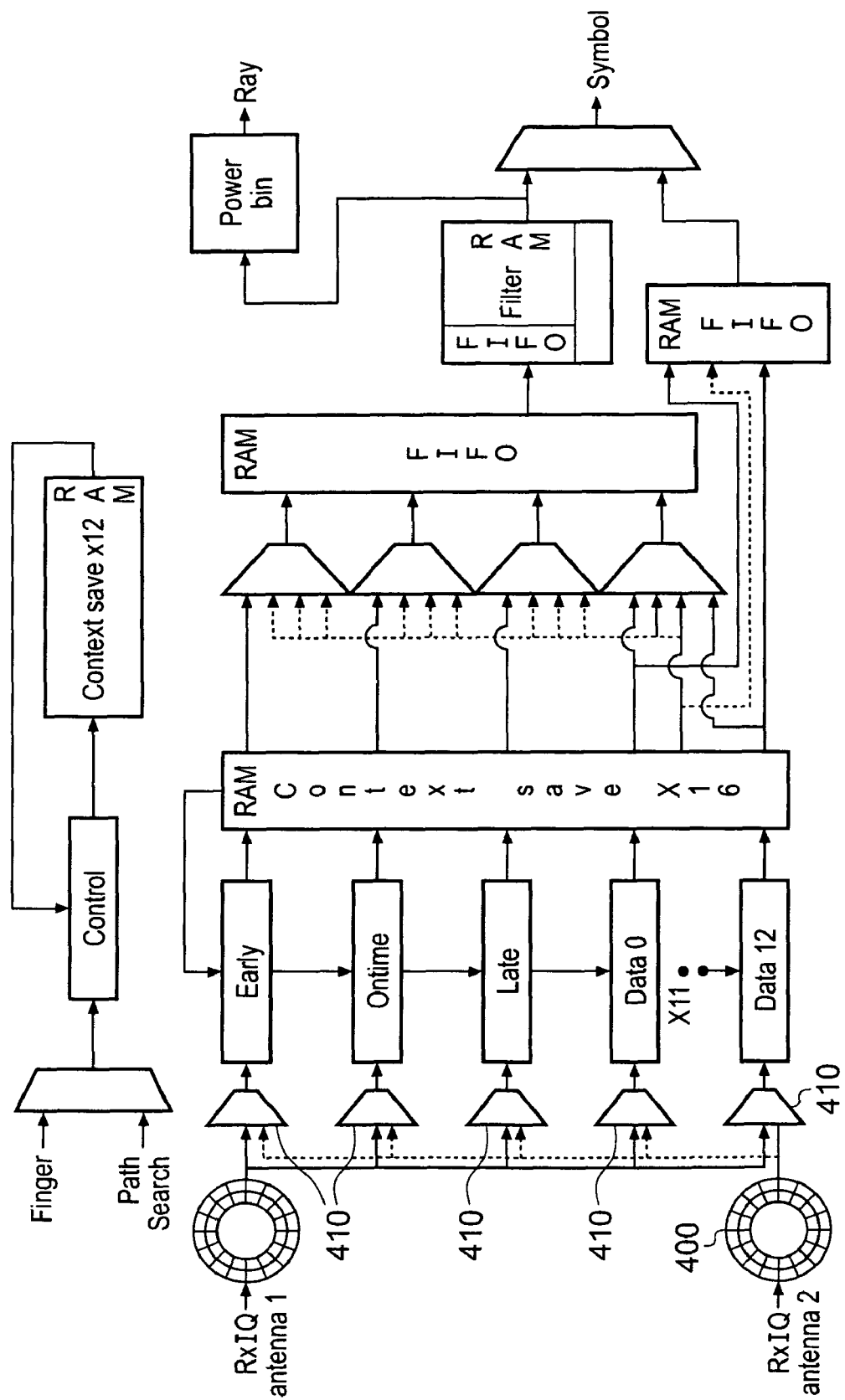
FIG. 12 shows the circuit of FIG. 10 modified to include a second buffer and multiplexers so as to be able to select data from two receivers (RF front ends, down converters and A/D stages) for receive diversity.

The combined rake receiver and path search time multiplexed finger of FIG. 10 can be further modified, as shown in FIG. 12, by the inclusion of a second receive buffer 400 for a second receive path. In order to allow each of the correlators to be able to select from either the first receive buffer 250 or the second receive buffer 400 a plurality of multiplexers 410 are interposed between the receive buffers 250 and 400 and the data correlators. Thus, under the control of the finger controller, each correlator can select data from the first receive chain, which feeds buffer 250, or from a second receive chain which feeds buffer 400.

It is possible to time-share since the correlators are active for a single cycle for each finger. The filters process data at a much slower rate (maximum of 256 chips). Hence it is possible to decouple the time-shared fingers and process the filtering at a much slower rate.

Flexible Time Slot Allocation to Improve Path Search Time

Within a time multiplexed path searcher described hereinbefore each virtual finger which is allocated a time slot in the time multiplexed rake hardware could instead be allocated to a path searcher.

Indeed the time multiplexed hardware can be used to allocate up to all sixteen virtual fingers to path searching.

This provides a benefit is in terms of power saving. Prior art path searchers take between 6.2 slots and 24.8 slots (using maximum window size parameters) depending on the number of CPICH symbols used in the running sum that is performed to identify the signal power that may exist in a potential propagation path which is being investigated. During this path search time the radio/RF front end and analog baseband components are running and consuming power.

This power consumption for characterising the transmission path is not merely incurred at switch on, but is incurred every few seconds. The use of the time multiplexed fingers not being actively used by the rake receiver enables the path searching to be done more quickly as more resource can be allocated to the task. If, for example, all sixteen virtual fingers of the rake receiver described hereinbefore were used then the search time could be by a factor of 16.

The path searchers identify ray paths using the CPICH symbols to a ½ chip granularity and operate nominally at chip rate. The fingers within the rake receiver operable as path searchers are typically clocked at 16× chip rate. When using a single time slot, i.e. the time allocated to a single virtual finger by the hardware, the searcher operates across 8 chips at a time with ½ chip resolution.

If more than one time slot were allocated to the path searcher, the number of chips operated over increases. For example, if all 16 time slots were used for the searcher, a single search window will search over 128 chips. The search time will scale down proportionally.

Figure 13:
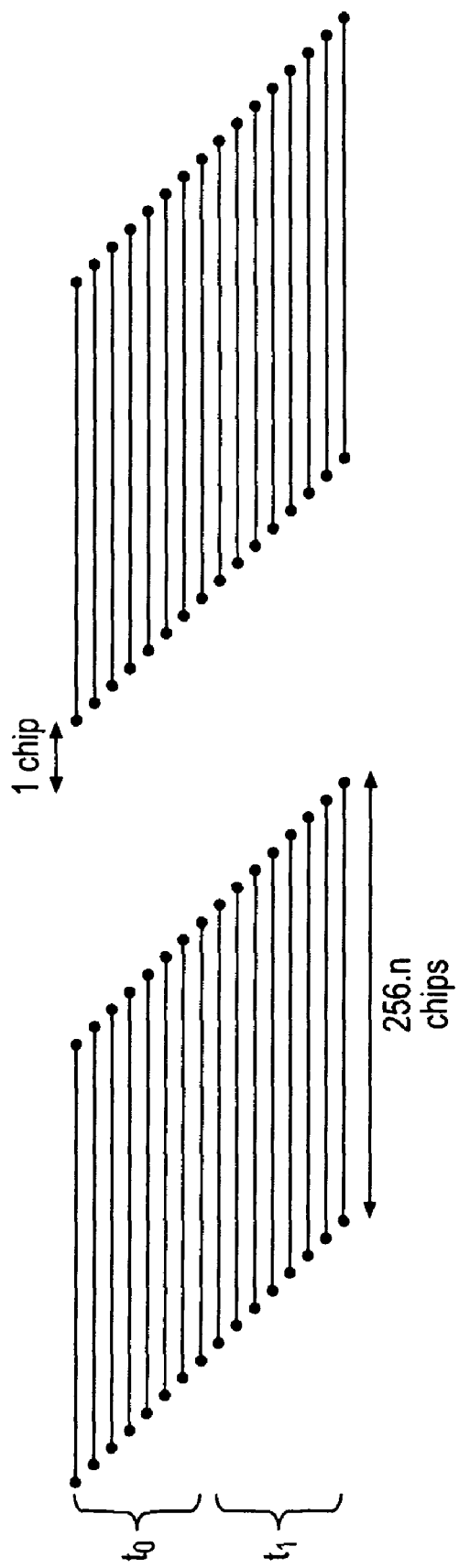
FIG. 13 shows relative correlator timing (not to scale) in a time shared path searcher constituting an embodiment of the present invention.

When more than one time slot is used, the subsequent time slots are triggered sequentially creating a cascaded set of correlations as shown in FIG. 13. Once all the correlators associated with time slot t0 have started, the correlators for time slot t1 are triggered. This flow continues until all time slots associated with the same path searcher are triggered.

As shown in FIG. 13, and as mentioned hereinbefore each correlator is the offset in time with respect to its neighbour by ½ chip, so sixteen correlators work on a total of 8 chip locations with ½ chip granularity.

The total search time to locate a time slot extends over multiple CPICH symbols. Each CPICH symbol is spread out over 256 chips. Thus, as shown in FIG. 13 each search is performed over 256בn" chips, where "n" is a positive integer (typically 8). Searching over multiple CPICH symbols gives a better result after accounting for space time transmit diversity and also averaging over several symbols reduces the effects of noise.

Once the mini-window (described by number of CPICH symbols to correlate over) is complete, there is a one chip delay before the entire sequence restarts. This processes is repeated until all correlations are completed. If the chip delay is not inserted, subsequent searches would be occurring at the same chip locations as the previous windows.

The operation (for a 2 CPICH symbol example) involved in the correlations is described in more detail below. All the correlators use the same de-rotate/descramble symbol, but a delayed version of the receive sample in a single integration cycle.

The derotate/descramble sequence is designated by d and the running sum for the CPICH estimation is formed over a range of 512 chips d(x) to d(x+511). This sequence is used for each propagation path estimate. The received chips "r" are correlated against the derotate/descramble sequence.

By using the early, on time, late and data 0 to data 12 correlators within each finger then a single finger can process 16 possible paths.

Thus finger 1 has 16 correlator outputs (early,1, ontime,1, late,1, data0,1, data1,1, data2,1 ... data12,1 where the final index which is "1" in this example represents the time slot number) and hence the first correlator starts correlating with a relative time shift between the descramble/derotate code of 0 units, the next correlator works with a relative delay one unit (equal to half chip in this embodiment).

The third correlator works with an additional relative delay of one unit. If we assume that it is the input data that is delayed with respect to the derotate/descramble code the we can describe the actions of the correlators with the following equations.

$O(\text{early}_1) = d(x)r(t) + d(x+1)r(t+1) + \ldots + d(x+511)r(t+511)$ $O(\text{ontime}_1) = d(x)r(t+1) + d(x+1)r(t+2) + \ldots + d(x+511)r(t+512)$ $O(\text{last}_1) = d(x)r(t+15) + d(x+1)r(t+16) + \ldots + d(x+511)r(t+526)$ $O(\text{early}_2) = d(x)r(t+16) + d(x+1)r(t+17) + \ldots + d(x+511)r(t+527)$ $O(\text{ontime}_2) = d(x)r(t+17) + d(x+1)r(t+18) + \ldots + d(x+511)r(t+528)$ $O(\text{last}_2) = d(x)r(t+31) + d(x+1)r(t+32) + \ldots + d(x+511)r(t+542)$ $O(\text{early}_3) = d(x)r(t+32) + d(x+1)r(t+33) + \ldots + d(x+511)r(t+543)$ $O(\text{last}_{16}) = d(x)r(t+255) + d(x+1)r(t+256) + \ldots + d(x+511)r(t+766)$ d( )—derotate/descramble symbol
r( )—Receive IQ sample
o( )—Correlator Output It can therefore be seen that the first correlator starts correlating against input chip r(t) which is multiplied against the first descramble code d(x) whereas the last correlator (data 12) of the finger works with an input signal which has been delayed by fifteen units (½ chips) and hence the first derotation/descrambling symbol d(x) is multiplied with data chip (r(t+7.5). Consequently the early correlator of the second finger starts correlating against received IQ chip (r(t×8) and so on.

In this example we have chosen ½ chip spacing but other choices exist.

During deep sleep mode the system is expected to wake up occasionally to receive paging channels. During these page bursts the path searchers are required to identify suitable propagation paths for the fingers. Using all sixteen time slots reduces the search time by a factor of 16. This could give rise to significant improvements in standby time for a mobile telephone, with the inventors estimating that standby time improvements of up to a factor of 10 may be possible.

The arrangements described herein to recover the CPICH can also be adapted to recover the scrambling code used by the base station and also to perform secondary sync detection.

The invention claimed is:

1. A rake receiver having a rake receiver finger operated in a time multiplexed manner to perform the task of a plurality of fingers, each of these fingers being a virtual finger allocated to a time slot in an operation cycle of the rake receiver finger, and wherein a buffer is provided for buffering at least one received chip of data, and where a spare virtual finger is provided to any virtual finger requesting extra processing within an operation cycle of the time multiplexed rake receiver finger, and wherein when a virtual finger becomes advanced with respect to a nominal "on time" position by more than a predetermined value, then processing for that finger is suspended for one cycle and the read position in the buffer retarded by one chip.

2. A rake receiver as claimed in claim 1, wherein the buffer contains at least two chips worth of data.

3. A rake receiver having a rake receiver finger operated in a time multiplexed manner to perform the task of a plurality of fingers, each of these fingers being a virtual finger allocated to a time slot in an operation cycle of the rake receiver finger, and wherein a buffer is provided for buffering at least one received chip of data, and where a spare virtual finger is provided to any virtual finger requesting extra processing within an operation cycle of the time multiplexed rake receiver finger, and wherein when a virtual finger becomes delayed with respect to its nominal "on time" position by more than a predetermined value, it requests extra processing time and adjusts its position in the buffer by one chip.

4. A rake receiver as claimed in claim 1, in which a plurality of memory locations are provided in a memory of the time multiplexed finger such that memory locations can be individually allocated to each virtual finger by a controller.

5. A rake receiver as claimed in claim 1, wherein the finger further comprises a plurality of CPICH and data correlators.

6. A rake receiver as claimed in claim 5, wherein the finger has twelve data correlators, three CPICH correlators and one TMP correlator.

7. A rake receiver as claimed in claim 5, wherein data from the correlators is stored in a buffer prior to being output on a serial databus.

8. A mobile communication device including a rake receiver as claimed in claim 1.

9. A method of operating a correlator block comprising at least one correlator adapted to recover a pilot signal and at least one correlator for recovering a spread symbol from a plurality of chips in a time multiplexed manner so as to form a plurality of virtual fingers of a rake receiver, the method comprising buffering at least one chip of data in a input buffer and enabling each virtual finger to access data from the buffer, and wherein a virtual finger can request an additional processing slot in a multiplex cycle if the virtual finger requests data that has been held within the buffer for less than a predetermined period.

10. A rake receiver as claimed in claim 3, in which the despreading code for the virtual finger is adjusted by one chip to take account of the additional processing allocated to the virtual finger.

* * * * *

UNITED STATES PATENT AND TRADEMARK OFFICE
CERTIFICATE OF CORRECTION

PATENT NO. : 8,125,973 B2
APPLICATION NO. : 12/050999
DATED : February 28, 2012
INVENTOR(S) : Timothy Fisher-Jeffes et al.

It is certified that error appears in the above-identified patent and that said Letters Patent is hereby corrected as shown below:

On the title page, item (73), correct the residence of Assignee from "Science-Based Insustrial Park" to --Science-Based Industrial Park--.

Signed and Sealed this
First Day of May, 2012

David J. Kappos
*Director of the United States Patent and Trademark Office*